Figure 1:
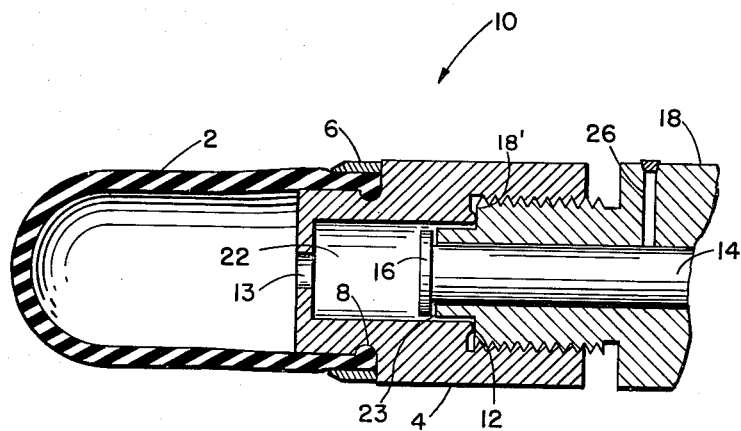

Oct. 30, 1962     P. W. MALLOY     3,061,043
SPEEDOMETER LUBRICATING TOOL
Filed June 29, 1960

INVENTOR
PERCY W. MALLOY

BY *H. Keith Schoff*

ATTORNEY

United States Patent Office 3,061,043
Patented Oct. 30, 1962

3,061,043
SPEEDOMETER LUBRICATING TOOL
Percy William Malloy, Madison, Wis., assignor to Malloy
Manufacturing Company, Madison, Wis., a partnership
Filed June 29, 1960, Ser. No. 39,613
6 Claims. (Cl. 184—105)

This invention relates to a lubricator for cleaning and lubricating speedometers and tachometers, and more particularly relates to a speedometer and tachometer lubricating tool which can be used to lubricate an instrument bearing by forcing lubricant between the end of the bearing and the shaft supported thereby.

A conventional speedometer is constructed having a visible dial on which numerals are printed and having an indicating needle mounted on a rotatable spindle which is magnetically coupled to a rotatable flexible cable, the remote end of the cable being geared to the drive shaft of the vehicle, or in the case of a tachometer, to the crank shaft of the engine. This construction is nearly universally used and provides an instrument which is generally troublefree in operation and which seldom requires servicing.

This invention provides a tool which can be used to clean and lubricate speedometers and tachometers without removing the instruments from their mounting in a vehicle. The lubricator of this invention is attached to the instrument to be lubricated by removing the flexible rotatable actuating cable therefrom and attaching the tool to the exposed threaded fitting behind the dash panel. The lubricator is relatively short in length and is comprised without moving parts. It is simply constructed and is easily used and will not leak even when extreme pressures are used to force lubricant into the instrument being lubricated.

It is an object of this invention to provide a lubricating and cleaning tool for speedometer and tachometers.

It is another object of this invention to provide a cleaning tool in which cleaning fluid or lubricant may be intermittently introduced and extracted from a shaft bearing.

It is another object of this invention to provide a cleaning tool which is actuated by alternately squeezing and releasing a resilient fluid-filled bulb.

Figure 2:
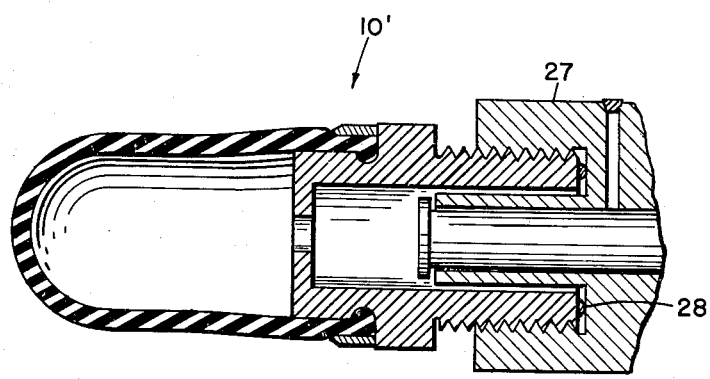

Other objects will become apparent from the drawings and from the following detailed description in which it is intended to illustrate the applicability of the invention without thereby limiting its scope to less than that of all equivalents which will be apparent to one skilled in the art. In the drawings, like reference numerals refer to like parts, and FIGURE 1 is a cross-sectional elevation of the article of this invention;

FIGURE 2 is a cross-sectional elevation of another embodiment of the article of this invention.

Referring now to FIGURE 1, there is shown speedometer spindle 14 extending from a speedometer head (not shown) wherein spindle 14 is enabled to rotate in bearing 18 and to longitudinally move in bearing 18 a few thousandths of an inch. Longitudinal movement of the spindle is possible in virtually all commercial speedometer and tachometer instruments. A flexible cable housing is attached to threads on bearing 18 during operation of the instrument. A rotatable flexible cable is contained within the casing and magnetic means affixed to the cable end is disposed inoperable near adjacency to plate 16 on spindle 14 during operation of the instrument. During lubrication of the instrument, the cable housing is removed from connection with bearing 18, and tool 10 is connected to bearing 18 as shown in FIGURES 1 and 2. A reservoir 26 herein called an oil wick, for holding lubricant is provided in bearing 18 for lubricating bearing 18 during operation of the instrument. Oil wick 26 may be filled with lubricant of recommended weight, e.g., number 10–W motor oil, without spindle 14 being removed from bearing 18, by oil being introduced between spindle 14 and bearing 18.

At one end extremity of tool 10 resilient elastomeric bulb 2 is provided, preferably comprised of a synthetic rubber composition such as butadieneacrylonitrile, synthetic rubber, butyl rubber, silicone rubber, butadiene-styrene copolymer, neoprene, or other elastomeric material having suitable solvent resistance for use with a cleaning fluid or a lubricating fluid which may be employed. Natural rubber or synthetic resinous substances such as polyethylene, polypropylene, polyvinylchloride or copolymers of vinyl chloride or other similar plastomeric materials may also be used. In a preferred embodiment of this invention, bulb 2 may be made from neoprene rubber of 3/32 inch thickness. Bulb 2 responds readily to application and release of manual pressure so as to cause the fluid contained therein to surge alternately in and out of bearing 18. Bulb 2 is attached to fitting 4 by being stretched thereover and is retained thereon by means of ring 6. It is preferred that the outside diameter of fitting 4 where bulb 2 is affixed is greater than the inside diameter of bulb 2 to necessitate expanding bulb 2 to enclose the end extremity of fitting 4. In a preferred embodiment the outside diameter of fitting 4 is at least from 1/64 inch to 1/32 inch larger than the inside diameter of bulb 2.

Bulb 2 is hermetically sealed to fitting 4 by means of one piece, closed retaining ring 6. Ring 6 is force-fitted over bulb 2 by sliding ring 6 on fitting 4 in a manner such that the rubber wall of bulb 2 is distended ahead of ring 6 and longitudinally pre-stressed under ring 6. The wall thickness of bulb 2 under ring 6 is reduced by a factor of about 1/6 in a preferred embodiment. Tool 10 when so assembled may be used with fluid of very low surface tension without leaking, even under pressures of 50 pounds per square inch gauge or greater arising in bulb 2. A seal of comparable strength and integrity is not provided by use of an expandable ring or by other irregularly configured fastening means. Force fitting of ring 6 over fitting 4 causes the end extremity of bulb 2 to completely fill annular recess 8 in fitting 4 and be compressed therein, thereby insuring that bulb 2 cannot be pulled from its seat on fitting 4 by the internal pressure of bulb 2. Adhesive may be provided in recess 8, however, it is not necessary to effect a proper seal. The seal that is obtained by force fitting is comprised with a ring of perfectly regular inside diameter and is preferred to means wherein a ring is compressed to provide an irregular shrunk diameter after the ring is properly placed. Also, such means do not distend the walls of bulb 2 ahead of the ring so as to fill recess 8 with compressed rubber. Bulb 2 is then enabled to be moved more easily from fitting 4 than by the means of this invention.

Orifice 13 communicates with well 22 in fitting 4 within which plate 16 and spindle 14 are free to move. Bead 12 is molded into fitting 4 concentrically about shaft 14 and is of a diameter slightly smaller than the groove diameter of threads on bearing 18. The provision of bead 12 prevents leakage around bearing 18. It is preferred that fitting 4 be provided with bead 12 of greater axial depth than radial thickness and be molded from a resilient, tough plastomeric material such as cellulose acetate butyrate synthetic resin or other comparable material such as nylon or polyacetal resin. Bead 12 is preferably injection-molded with fitting 4 and is disposed to make contacting relation with shoulder 18' on bearing 18. Because the diameter of bead 12 is less than the groove diameter of threads on bearing 18, imperfections in shoulder 18' caused by burrs or other imperfections remaining from the thread cutting operation on bearing 18 will not affect the seating of bead 12 on shoulder 18'. Fitting 4 may be screwed only finger-tight on bearing 18 and a seal of high integrity will be provided. The material that is used for making fitting 4 and bead 12 may be other suitable synthetic resinous molding powders, or in a non-preferred embodiment, bead 12 may be non-integral with fitting 4 and be made from gasket material such as copper, aluminum, asbestos or other well-known material.

In operation, oil or solvent may be introduced into the interior of bulb 2 through orifice 13 of fitting 4. Orifice 13 is restricted in size to minimize loss of fluid from tool 10 during the time that it is being threaded on bearing 18. When bulb 2 is filled with fluid and tool 10 is operably threaded on bearing 18, manual pressure may be applied to bulb 2 rhythmically to cause spindle 14 to move in response to the internal pressure of the fluid in bulb 2 longitudinally within bearing 18. Reciprocal movement of spindle 14 enables oil to pass between spindle 14 and bearing 18 into oil wick 26. If spindle 14 were not moved reciprocally plate 16 would seat against shoulder 18' with the result that very little fluid would pass between spindle 14 and bearing 18. To insure that positive lubrication is obtained the fluid in bulb 2 may be subjected to relatively high pressures of 50 pounds per square inch or more and may be squeezed between the forefinger and thumb of a person using the lubrication tool. It is generally sufficient to apply only a few pounds of pressure to clean and lubricate an instrument, however. The rhythmical movement of spindle 14 flushes foreign particles from bearing 18 and frees spindle 14 in the bearing.

In FIGURE 2 is shown another embodiment of the device of this invention wherein external threads are provided on tool 10' being adapted to engage internal threads of instrument 27. Gasket 28 is provided between tool 10' and casing 27 to provide a seal therebetween. A similar but smaller gasket could obviously be used between tool 10 and shoulder 18' of FIGURE 1, or molded bead 12 of FIGURE 1 could readily be adapted for use with tool 10' of FIGURE 2. However, a gasket is not preferred and does not provide the high pressure seal that is provided by the molded bead 12 of FIGURE 1.

The simple three-piece construction of tools 10 and 10' of this invention provides an inexpensive and dependable maintenance instrument for lubricating speedometers and tachometers. The reliability and dependability of tool 10 results from the seals provided by undersize retaining ring 6 and by bead 12 on fitting 4. In cross-sectional configuration as shown in FIGURE 1 bead 12 is arcuately configured and is of plastomeric composition so that it may adjust readily to slight irregularities in shoulder 18' but does not perform like an elastomer. A bead of such a configuration placed concentrically with and of smaller diameter than the threads on bearing 18 is essential to provide a tool of maximum utility in accordance herewith.

While certain modifications and embodiments of the invention have been described, it is of course to be understood that there are a great number of variations which will suggest themselves to anyone familiar with the subject matter thereof, and it is to be distinctly understood that this invention should not be limited except by such limitations as are clearly imposed in the appended claims.

I claim:

1. A speedometer and tachometer lubricating tool of the type described comprising in combination a resilient deformable elastomeric bulb, a plastomeric, relatively more rigid coupling member, an annular recess on the outer surface of said coupling member, a one piece closed retaining ring disposed concentric with said recess, an open end extremity of said bulb disposed around one end extremity of said coupling member over said annular recess and compressively sealed into said recess and prestressed adjacent thereto by means of said one-piece closed retaining ring, said coupling member characterized by a passageway extending longitudinally therethrough communicating with the interior volume of said bulb, an end extremity of said coupling member opposite the end extremity to which said bulb is affixed having threads thereon, the bottom-most of said threads terminating in a continuous annular bead concentric with the axis of said threads, said bead having a diameter smaller than the diameter of said threads.

2. The article of claim 1 wherein said bead is arcuate in transverse cross section and is integrally molded with said coupling member.

3. The article of claim 1 wherein said bead seats against the end extremity of a bearing to be lubricated when said coupling member is operably threaded on said bearing.

4. The device of claim 3 wherein said passageway is configured to enable longitudinal movement of an end extremity of a shaft within said bearing.

5. In a lubricating tool of the type described the combination of an elastomeric bulb fixedly attached to a relatively more rigid hollow coupling member by means of a rigid one piece underside retaining ring encircling said bulb, said coupling member being adapted to be sealably seated against an object to be lubricated by means of a bead of resilient composition unitary with said coupling member said bead being of closed annular configuration and being of greater axial dimension than radial thickness.

6. In a lubricating tool of the type described, the combination of an elastomeric bulb fixedly attached to a relatively more rigid hollow coupling member by means of a one-piece under size retaining ring circling said bulb, said bulb being characterized by being longitudinally prestressed under said ring, said coupling member being adapted to be sealably seated against an object to be lubricated by means of a bead of resilient composition unitary with said coupling member, said bead being of closed annular configuration.

References Cited in the file of this patent

UNITED STATES PATENTS

| 418,007 | Gillespie | Dec. 24, 1889 |
|---|---|---|
| 638,374 | Aronstein | Dec. 5, 1899 |
| 2,073,153 | Helgeby | Mar. 9, 1937 |
| 2,073,303 | Holder | Mar. 9, 1937 |
| 2,219,604 | Trotter | Oct. 29, 1940 |
| 2,515,611 | Preszler | July 18, 1950 |
| 2,706,017 | McMurray | Apr. 12, 1955 |
| 2,755,110 | Jacobs | July 17, 1956 |
| 2,761,705 | Kreidel | Sept. 4, 1956 |

FOREIGN PATENTS

| 18,976 | Great Britain | of 1895 |